United States Patent
Kazama et al.

(10) Patent No.: US 11,018,489 B2
(45) Date of Patent: May 25, 2021

(54) TERMINAL STRUCTURE OF ARMORED CABLE AND ARMOR WIRE ANCHORING DEVICE

(71) Applicant: SUMITOMO ELECTRIC INDUSTRIES, LTD., Osaka (JP)

(72) Inventors: Tatsuya Kazama, Osaka (JP); Takehiro Nozaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/629,730

(22) PCT Filed: Aug. 10, 2018

(86) PCT No.: PCT/JP2018/030123
§ 371 (c)(1),
(2) Date: Jan. 9, 2020

(87) PCT Pub. No.: WO2019/039330
PCT Pub. Date: Feb. 28, 2019

(65) Prior Publication Data
US 2020/0303915 A1    Sep. 24, 2020

(30) Foreign Application Priority Data

Aug. 23, 2017 (JP) .............................. JP2017-160542

(51) Int. Cl.
*H01B 9/02* (2006.01)
*H02G 7/02* (2006.01)
*H02G 15/04* (2006.01)

(52) U.S. Cl.
CPC ................................. *H02G 15/04* (2013.01)

(58) Field of Classification Search
CPC .... H01B 7/221; H01B 9/025; H01B 11/1041; H02G 7/02; H02G 15/02
See application file for complete search history.

(56) References Cited

U.S. PATENT DOCUMENTS

| 4,185,264 | A | * | 1/1980 | Chrastina | ................. | B63G 7/06 |
| | | | | | | 114/244 |
| 4,813,754 | A | * | 3/1989 | Priaroggia | ........... | G02B 6/4448 |
| | | | | | | 385/69 |
| 2012/0024565 | A1 | * | 2/2012 | Orini | ....................... | H01B 7/14 |
| | | | | | | 174/106 R |

FOREIGN PATENT DOCUMENTS

| JP | S56-158635 U | 11/1981 |
| JP | S59-136109 U | 9/1984 |
| JP | S59-170808 A | 9/1984 |

(Continued)

*Primary Examiner* — Chau N Nguyen
(74) *Attorney, Agent, or Firm* — Oliff PLC (57) ABSTRACT

A terminal structure of an armored cable includes an end of an armored cable, a terminal metal fitting, and a support. The end includes a core, and an armoring including armor wires made of copper or copper alloy disposed on an outer circumference of the core. The terminal metal fitting is attached to an end of each armor wire. The support is disposed on a tip side of the core and supports a plurality of the terminal metal fittings. The support includes a base plate and a fixing member. The base plate is provided with a first through hole into which the core is inserted, and second through holes which are provided on an outer circumference of the first through hole and into each of which a corresponding one of the terminal metal fittings is inserted. The fixing member fixes each terminal metal fitting to the base plate.

6 Claims, 3 Drawing Sheets

(56) References Cited

FOREIGN PATENT DOCUMENTS

| | | | |
|---|---|---|---|
| JP | 2000-287350 | A | 10/2000 |
| JP | 2002-320320 | * | 10/2002 |
| JP | 2003-009369 | A | 1/2003 |
| JP | 2003-158815 | A | 5/2003 |

* cited by examiner

TERMINAL STRUCTURE OF ARMORED CABLE AND ARMOR WIRE ANCHORING DEVICE

TECHNICAL FIELD

The present disclosure relates to a terminal structure of an armored cable and an armor wire anchoring device.

The present application claims a priority based on Japanese Patent Application No. 2017-160542 filed on Aug. 23, 2017, the entire contents of which are incorporated herein by reference.

BACKGROUND ART

PTLs 1 to 3 each disclose a submarine cable including an armoring on its outer circumferential side. A typical armoring is formed such that a plurality of iron wires are wound around the outer circumference of a cable core including a conductor, an insulating layer, and a shielding layer (FIG. 5 of PTL 1).

CITATION LIST

Patent Literature

PTL 1: Japanese Patent Laying-Open No. 2003-009369
PTL 2: Japanese Utility Model Laying-Open No. 59-136109
PTL 3: Japanese Patent Laying-Open No. 2003-158815

SUMMARY OF INVENTION

A terminal structure of an armored cable according to the present disclosure includes:
an end of an armored cable including
a core including an insulating layer on an outer circumference of a conductor, and
an armoring including a plurality of armor wires disposed on an outer circumference of the core, the plurality of armor wires being made of copper or copper alloy;
a terminal metal fitting attached to an end of each of the plurality of armor wires; and
a support disposed on a tip side of the core and supporting a plurality of the terminal metal fittings,
wherein the support includes
a base plate provided with
a first through hole into which the core is inserted, and
a plurality of second through holes which are provided on an outer circumference of the first through hole and into each of which a corresponding one of the plurality of terminal metal fittings is inserted, and
a fixing member fixing each of the plurality of terminal metal fittings to the base plate.

An armor wire anchoring device according to the present disclosure is an armor wire anchoring device for anchoring armor wires at an end of an armored cable including a core and an armor, the core including an insulating layer on an outer circumference of a conductor, the armoring including a plurality of armor wires disposed on an outer circumference of the core, the armor wire anchoring device including:
a terminal metal fitting attached to an end of each of the plurality of armor wires made of copper or copper alloy; and
a support supporting a plurality of the terminal metal fittings, wherein
the support includes
a base plate provided with
a first through hole into which the core is inserted, and
a plurality of second through holes which are provided on an outer circumference of the first through hole and into each of which a corresponding one of the plurality of terminal metal fittings is inserted, and
a fixing member fixing each of the plurality of terminal metal fittings to the base plate.

DETAILED DESCRIPTION

Problem to be Solved by the Present Disclosure

When the above armoring is formed of copper wires having a conductivity higher than that of iron wires, this copper-based armoring can be used as a conductive portion. For example, when the copper-based armoring serves as a flow path of a circulating current, a shielding layer of a cable core can be omitted (PTL 2), or power transmission capacity can be increased.

Contrastingly, a submarine cable including an armoring anchors armor wires in the vicinity of a connection between a land cable and the submarine cable ([0003] in the specification of PTL 1) or in an intermediate connection connecting submarine cables to each other ([0003] in the specification of PTL 3).

However, no thorough study has been conducted on the structure that reliably anchors copper wires forming armor wires for a long period when a copper-based armoring is included. Since the iron wire and copper wire have different mechanical characteristics, an anchoring structure used in a conventional iron wire armoring is not suitable in some cases. For example, when a copper-based armoring is formed of copper rectangular wires, the structure shown in FIG. 4 of PTL 1, in which an iron wire is wound around a cotter, would not be suitable. This leads to a desire for an anchoring structure suitable for a copper-based armoring.

The present disclosure therefore has an object to provide a terminal structure of an armored cable that can anchor an armor wire available as a conductive portion for a long period. The present disclosure has another object to provide an armor wire anchoring device that can anchor armor wires available as a conductive portion for a long period.

Advantageous Effect of the Present Disclosure

A terminal structure of an armored cable according to the present disclosure and an armor wire anchoring device according to the present disclosure can anchor an armor wire available as a conductive portion for a long period.

DESCRIPTION OF EMBODIMENTS

Embodiments of the present invention will initially be listed and described.

(1) A terminal structure of an armored cable according to an aspect of the present disclosure includes:
an end of an armored cable including
a core including an insulating layer on an outer circumference of a conductor, and
an armoring including a plurality of armor wires disposed on an outer circumference of the core, the plurality of armor wires being made of copper or copper alloy;
a terminal metal fitting attached to an end of each of the plurality of armor wires; and
a support disposed on a tip side of the core and supporting a plurality of the terminal metal fittings,
wherein the support includes
a base plate provided with
a first through hole into which the core is inserted, and
a plurality of second through holes which are provided on an outer circumference of the first through hole and into each of which a corresponding one of the plurality of terminal metal fittings is inserted, and
a fixing member fixing each of the plurality of terminal metal fittings to the base plate.

In the terminal structure of an armored cable according to the present disclosure, the terminal metal fitting attached to each armor wire is inserted into the base plate disposed on the tip side of the armored cable, and is further fixed to the base plate with the fixing member. In other words, unlike the structure described above in which each armor wire is wound around a cotter, in the terminal structure of an armored cable, each armor wire is disposed while being stretched. Also, the stretched state of each armor wire is maintained by each terminal metal fitting being fixed to the base plate. In such a terminal structure of an armored cable according to the present disclosure, even when an anchor of a ship is caught by an armored cable and the armored cable is pulled, application of an excessive amount of bending to each armor wire can be reduced. Thus, the terminal structure of an armored cable according to the present disclosure can anchor each armor wire for a long period, though each armor wire is made of copper or copper alloy. Even when each armor wire is a copper rectangular wire or the like, each armor wire can be anchored properly. With such a terminal structure of an armored cable according to the present disclosure, the copper-based armoring can be satisfactorily used as a conductive portion. Also, in the terminal structure of an armored cable according to the present disclosure, each terminal metal fitting can be easily fixed to the base plate by attaching the fixing member to the terminal metal fitting inserted into the second through hole. The terminal structure of an armored cable according to the present disclosure thus has excellent workability in construction.

(2) In one example form of the terminal structure of an armored cable according to the present disclosure,
the plurality of terminal metal fittings fixed to the base plate are disposed concentrically with the core at a predetermined spacing from the core,
the terminal structure includes a spacer holding part of a region of each of the plurality of armor wires apart from the core, the region extending from a base side close to the core to the terminal metal fitting, and
the spacer includes a deflection part that adjusts an angle of each of the plurality of armor wires such that a portion of each of the plurality of terminal metal fittings which is fixed to the base plate is parallel to an axial direction of the core.

"Parallel" herein includes a case in which the terminal metal fitting is geometrically parallel, as well as a case in which the terminal metal fitting is disposed to be considered to be parallel. For example, "parallel" herein includes a case in which the terminal metal fitting is disposed such that an inclination of an axis of the terminal metal fitting from the axis of the core is within about three degrees.

In this form, the deflection part of the spacer adjusts the angle of each armor wire, and each terminal metal fitting is fixed to the base plate to be parallel to the axial direction of the core. Thus, even when the armored cable is pulled as described above, application of an excessive amount of bending to each armor wire can be reduced further. In this form, thus, each armor wire can be anchored properly for a long period, and the copper-based armoring can be used as a conductive portion.

(3) In an example form, the terminal structure of an armored cable according to (2) above includes a coupling member fixing the spacer to the support.

In the above form, the spacer is fixed to the support, and the position of the spacer is not substantially displaced. The deflection part can thus hold the angle of each armor wire properly for a long period. In this form, accordingly, each armor wire can be anchored more properly for a long period, and the copper-based armoring can be used as a conductive portion.

(4) In an example form of the terminal structure of an armored cable according to the present disclosure,
the terminal metal fitting has an outer circumferential surface subjected to threading,
the fixing member includes a base nut and a tip nut each screwed with a corresponding one of portions of the outer circumferential surface of the terminal metal fitting, one of the portions projecting from a front surface of the base plate, the other portion projecting from a rear surface of the base plate, and
an inner circumferential surface of each of the plurality of second through holes is formed of a smooth surface with which the terminal metal fitting is not screwed.

In this form, the terminal metal fitting can be fixed firmly to the base plate by screwing the nut to each of the base side and the tip side of the terminal metal fitting. Also, in this form, each terminal metal fitting per se is not directly screwed with the base plate. In this form, the state of projection of each terminal metal fitting from the base plate is adjusted, and the positions of screwing of the base nut and the tip nut are adjusted, thereby fixing each terminal metal fitting to the base plate. In other words, in this form, each armor wire can be anchored properly without being twisted. In this form, accordingly, each armor wire can be firmly anchored for a long period, and the copper-based armoring can be used as a conductive portion.

(5) In one example form, the terminal structure of an armored cable according to the present disclosure includes a collector plate disposed on the tip side of the core relative to the base plate and connected with a tip of each of the plurality of terminal metal fittings.

In this form, the respective currents flowing through the armor wires can be efficiently collected on the collector plate. Also, in this form, a grounding conductor or a coupling conductor, which will be described below, can be connected easily. In this configuration, the copper-based armoring is more easily used as a conductive portion.

(6) An armor wire anchoring device according to an aspect of the present disclosure is an armor wire anchoring device for anchoring armor wires at an end of an armored cable including a core and an armor, the core including an insulating layer on an outer circumference of a conductor, the armoring including a plurality of armor wires disposed on an outer circumference of the core, the armor wire anchoring device including:

a terminal metal fitting attached to an end of each of the plurality of armor wires made of copper or copper alloy; and a support supporting a plurality of the terminal metal fittings, wherein the support includes a base plate provided with a first through hole into which the core is inserted, and a plurality of second through holes which are provided on an outer circumference of the first through hole and into each of which a corresponding one of the plurality of terminal metal fittings is inserted, and a fixing member fixing each of the plurality of terminal metal fittings to the base plate.

The armor wire anchoring device according to the present disclosure can anchor each armor wire as described below. The terminal metal fitting is attached to each armor wire at the end of the armored cable. The terminal metal fittings are inserted into the base plate to be fixed to the base plate with the fixing member. In particular, with the use of the armor wire anchoring device according to the present disclosure, each armor wire can be maintained in the stretched state by fixing each terminal metal fitting to the base plate through the fixing member. The armor wire anchoring device according to the present disclosure can thus reduce application of an excessive amount of bending to each armor wire when, for example, the armored cable is pulled as described above. Thus, the armor wire anchoring device according to the present disclosure can anchor each armor wire for a long period, though each armor wire is made of copper or copper alloy. Each armor wire can be anchored properly even when it is a copper-based rectangular wire or the like. The armor wire anchoring device according to the present disclosure can be preferably used to anchor an armor wire to an armored cable including a copper-based armoring as a conductive portion. Also, the armor wire anchoring device according to the present disclosure can easily fix each terminal metal fitting to the base plate by attaching the fixing member to the terminal metal fitting inserted into the second through hole. This leads to excellent anchoring workability of the armor wire anchoring device according to the present disclosure.

Details of Embodiment of the Present Disclosure

A terminal structure of an armored cable and an armor wire anchoring device according to an embodiment of the present disclosure will now be described specifically with reference to the drawings. In the drawings, the same reference characters designate the same components.

Embodiment

A terminal structure 1 of an armored cable according to the embodiment and an armor wire anchoring device 10 according to the embodiment will be described with reference to FIGS. 1 to 4.

Figure 1A:
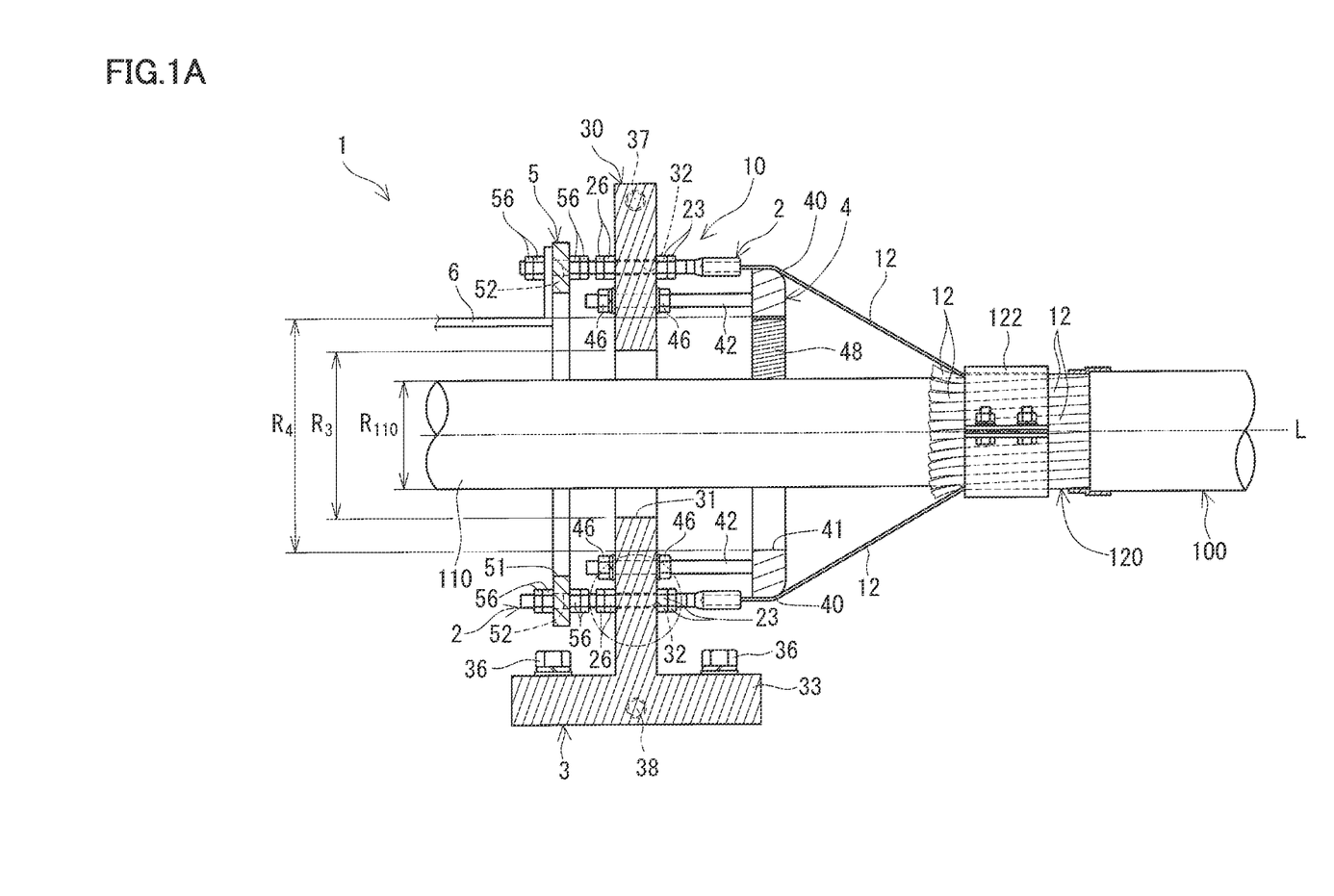
FIG. 1A schematically shows a configuration of a terminal structure of an armored cable according to an embodiment.
Figure 2:
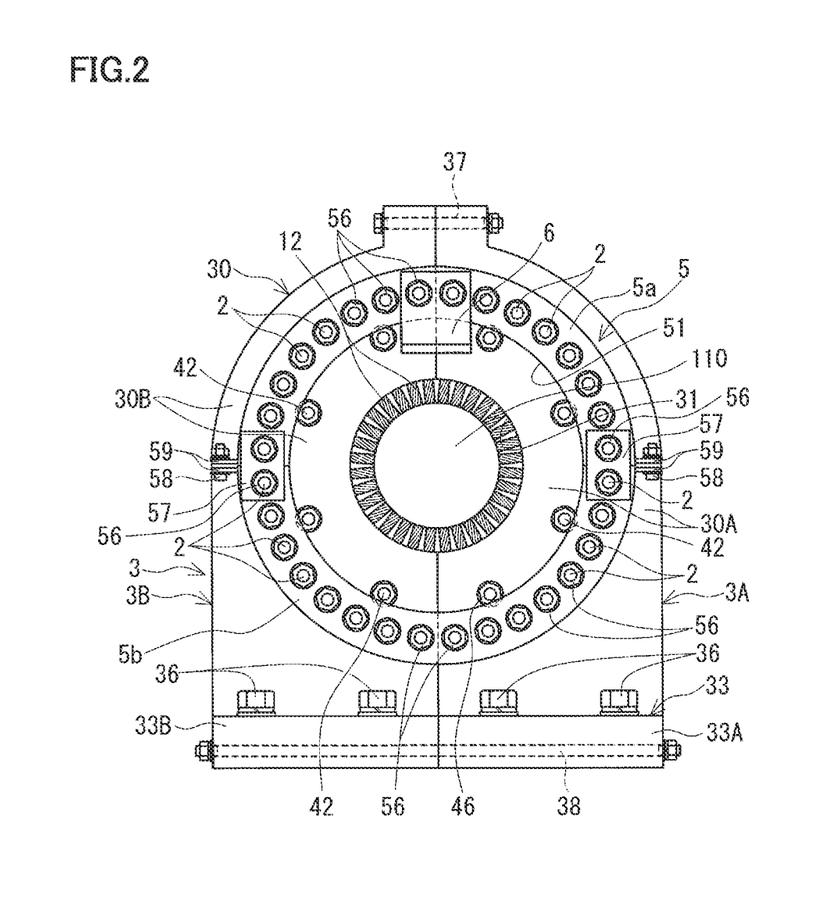
FIG. 2 is a schematic front view of the terminal structure of an armored cable according to the embodiment, which is viewed from the axial direction of the armored cable.

FIGS. 1A and 2 show the state in which armor wires 12 constituting an armoring 120 are anchored at an end of an armored cable 100 by armor wire anchoring device 10 according to the embodiment.

FIG. 1A is a lateral view showing the above anchored state from the direction orthogonal to an axis L of armored cable 100. FIG. 1A shows the appearance of armored cable 100. FIG. 1A also shows a cross-section of anchoring device 10, which is cut along a plane parallel to axis L of armored cable 100.

Figure 1B:
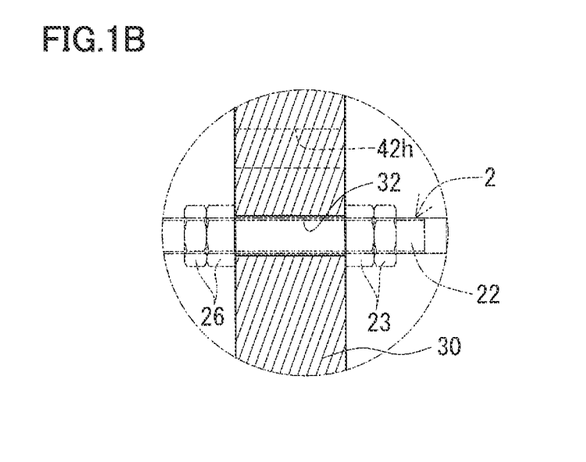
FIG. 1B shows a portion of the terminal structure of an armored cable according to the embodiment in an enlarged manner, which is circled by an alternate long and short dash line shown in FIG. 1A.

FIG. 1B is an enlarged view of a portion circled by an alternate long and short dash line in FIG. 1A. This enlarged view is a sectional view of part of support 3, which is cut along the plane parallel to axis L. The position of cutting is a position at which the inner circumferential shape of a second through hole (metal fitting hole 32, which will be described below) is easily understandable in support 3. The enlarged view of FIG. 1B shows a terminal metal fitting 2 virtually and does not show a coupling member 42.

FIG. 2 is a front view showing the above anchored state in the direction of axis L of armored cable 100, which is viewed from the left side in FIG. 1A.

Figure 4:
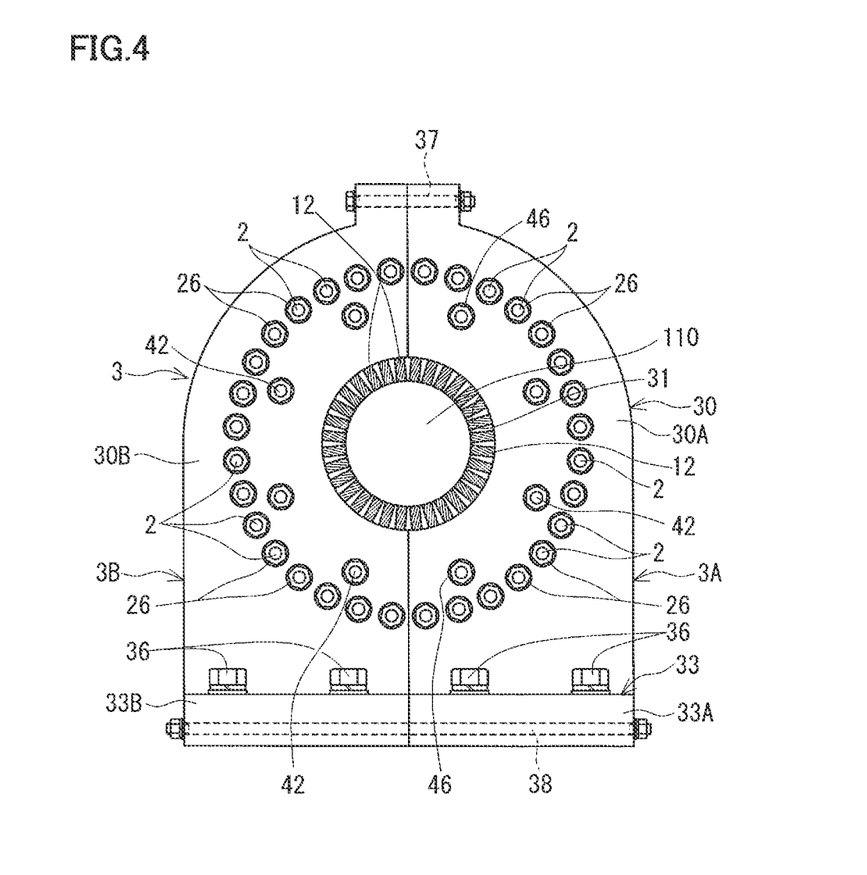
FIG. 4 is a schematic front view of a support included in the terminal structure of an armored cable according to the embodiment, which is viewed from the axial direction of the armored cable.

FIG. 4 is a front view showing the above anchored state, which is viewed from the direction of axis L of armored cable 100, with a collector plate 5, nuts 56, and a grounding conductor 6 omitted from FIG. 2. FIGS. 2 and 4 do not show a core 110 in detail.

With reference to FIGS. 1A, 2, and 4, description will be given of a case in which the lower portion and the upper portion of the sheet of paper are respectively referred to as a lower side and an upper side, and the side on which support 3 is fixed to an installation target is the lower portion of the sheet of paper. Description will also be given of a case in which terminal structure 1 of an armored cable and armor wire anchoring device 10 anchor each armor wire 12 at a portion at which a submarine cable and a land cable are connected.

(Overview)

Terminal structure 1 of an armored cable according to the embodiment and armor wire anchoring device 10 according to the embodiment are used to anchor armor wires 12 constituting armoring 120 at a portion of an end, which is exposed by stage stripping, of armored cable 100 including armoring 120 on an outer circumference of core 110, such as a submarine cable, as shown in FIG. 1A. Terminal structure 1 of an armored cable can be constructed typically using armor wire anchoring device 10 according to the embodiment.

Figure 3:
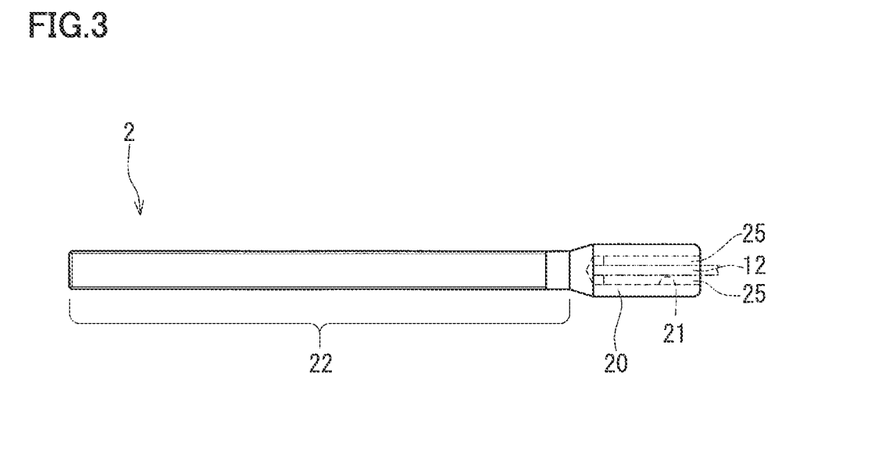
FIG. 3 schematically shows a configuration of a terminal metal fitting included in the terminal structure of an armored cable according to the embodiment.

Terminal structure 1 of an armored cable according to the embodiment and armor wire anchoring device 10 according to the embodiment have a configuration particularly suitable for a case in which armor wires 12 constituting armoring 120 are made of copper or copper alloy. Specifically, terminal structure 1 of an armored cable according to the embodiment and armor wire anchoring device 10 according to the embodiment include terminal metal fittings 2 each attached to an end of a corresponding one of armor wires 12, and a support 3 supporting terminal metal fittings 2. Support 3 includes a base plate 30 and a fixing member fixing each terminal metal fitting 2 to base plate 30. Base plate 30 is provided with a first through hole (hereinafter referred to as a core hole 31) into which core 110 is inserted, and second through holes (hereinafter referred to as metal fitting holes 32) into each of which a corresponding one of terminal metal fittings 2 is inserted. Each metal fitting hole 32 is provided on the outer periphery of core hole 31. Each terminal metal fitting 2 in this example has an outer circumferential surface (the outer circumferential surface of fixing shaft 22 in FIG.

3) subjected to threading. The fixing member in this example includes a base nut 23 and a tip nut 26.

Typically, in terminal structure 1 of an armored cable, support 3 is disposed on the tip side (the left side in FIG. 1A) of core 110 which is exposed by stage-stripping the end of armored cable 100. Armor wires 12 exposed by stage stripping described above are disposed to spread radially from the base side (the right side in FIG. 1A) toward support 3. Each terminal metal fitting 2 attached to its corresponding armor wire 12 is inserted into base plate 30 of support 3 and is also fixed to base plate 30 with the fixing member. Through this fixing, each armor wire 12 is anchored to support 3 while being maintained in the stretched state. Terminal structure 1 of an armored cable and armor wire anchoring device 10 in this example further include a spacer 4 holding part of each armor wire 12, and collector plate 5 connected with the tip of each terminal metal fitting 2. Spacer 4 is disposed on the base side of core 110 relative to base plate 30. Collector plate 5 is disposed on the tip side of core 110 relative to base plate 30.

First, an outline of armored cable 100 will be described. Next, terminal structure 1 of an armored cable according to the embodiment will be mainly described.

(Armored Cable)

Armored cable 100 includes core 110 including an insulating layer on the outer circumference of a conductor, and armoring 120 including armor wires 12 disposed on the outer circumference of core 110. Armoring 120 can include a protective layer, for example, an anticorrosive layer, on its outer circumference. As to the basic configuration of core 110, a conventional submarine cable or the like can be referred to. Typically, core 110 includes a conductor, an inner semiconducting layer, an insulating layer, an outer semiconducting layer, an impervious layer, an anticorrosive layer, or any other layer in order from inside.

In particular, armoring 120 is a copper-based armoring including armor wires 12 made of copper or copper alloy. Such an armoring 120 is used as a conductive portion, for example, a flow path of a circulating current or the like. Copper or copper alloy, which has excellent conductivity and excellent corrosion resistance compared with iron, is suitable for armoring 120 of a submarine cable or the like. Armoring 120 made of copper (pure copper) as in this example has more excellent conductivity. Armoring 120 made of copper alloy has excellent strength compared with armoring 120 made of copper.

Each armor wire 12 in this example is a rectangular wire having a rectangular transverse section. Thus, the space factor of armor wires 12 in armoring 120 can be increased easily, and the outside diameter of the cable can be reduced easily. Each armor wire 12 may be a circular wire having a circular transverse section.

Armoring 120 includes one or more wire rod layers formed of armor wires 12 wound spirally around the outer circumference of core 110 at predetermined pitches. Armoring 120 including two or more wire rod layers has a more excellent strength. Also, armoring 120 including two or more wire rod layers can have an increased sectional area of the conductor in armoring 120 to serve as a large-capacity conductive portion. FIGS. 1A, 2, and 4 show only one wire rod layer.

The number of wire rod layers, the number of armor wires constituting one wire rod layer, and the size such as the sectional area, width, and thickness of each armor wire 12 may be appropriately selected such that armoring 120 has a predetermined cross-section of the conductor. The number of armor wires in FIGS. 1A, 2, and 4, and the thickness and width of armor wire 12 in FIG. 1A are illustrated by way of example.

At the end of armored cable 100, armor wires 12 exposed by stage stripping are cut into a predetermined length and can be dispersed to spread radially outwardly of core 110. Thus, bundling portions of exposed armor wires 12 which are located on the base side of core 110 can prevent the dispersion described above, facilitating an anchoring operation. Described herein as an example of the structure for preventing the dispersion described above is a case in which a bundling band 122 having a predetermined width is wound around the base side of the exposed portion, and the opposite ends of bundling band 122 are fastened with bolts and nuts. The structure for preventing dispersion may have an appropriate configuration as long as the dispersion of armor wires 12 can be prevented.

Terminal metal fitting 2 is attached to the portion of each exposed armor wire 12 described above, which is located on the tip side of core 110. In each armor wire 12, a region (hereinafter also referred to as an intermediate region) from the base side equipped with bundling band 122 to terminal metal fitting 2 is disposed at a predetermined spacing from core 110 when terminal metal fitting 2 is fixed to support 3. In this example, the region of the intermediate region on the base side is disposed to cross axis L of core 110, and the region of the intermediate region on the terminal metal fitting 2 side is disposed to be parallel to axis L as described below.

(Terminal Structure of Armored Cable)

Terminal structure 1 of an armored cable according to the embodiment includes the end of armored cable 100, terminal metal fittings 2, and support 3 described above.

<<Terminal Metal Fitting>>>

Terminal metal fitting 2 in this example is a rod-shaped member as shown in FIG. 3, and includes a compression part 20 that compresses and connects armor wire 12 on a first end side (the right side in FIG. 3) and fixing shaft 22 fixed to support 3 on a second end side (the left side in FIG. 3). Compression part 20 has a closed hole 21 in which the tip of armor wire 12 is housed before compression, and armor wire 12 is compressed while being housed in closed hole 21. Through this compression, armor wire 12 is fixed to compression part 20 to be integrated with terminal metal fitting 2. In this example, closed hole 21 before compression is a circular hole. Thus, before compression with the tip of armor wire 12 being inserted into closed hole 21, semicircular-column-shaped clearances are created between the inner circumferential surface of this round hole and the front and rear surfaces of armor wire 12 formed of a rectangular wire. Terminal metal fitting 2 in this example thus includes fillers 25, 25 housed together with the tip of armor wire 12 in closed hole 21. Fillers 25, 25 are disposed so as to sandwich the front and rear surfaces of armor wire 12. As fillers 25, 25 sandwich armor wire 12 and also fill the clearances, armor wire 12 and compression part 20 can be firmly connected to each other with fillers 25, 25 therebetween. The size (thickness, the hole diameter of closed hole 21) of compression part 20 before compression, a fill volume of filler 25, and the like may be selected such that the size of compression part 20 after compression has a predetermined sectional area of the conductor.

Terminal metal fitting 2 and fillers 25, 25, which are made of copper or copper alloy, have excellent conductivity and can be used satisfactorily as a conductive portion together with armor wire 12. Also, copper, which is relatively soft and is easily compressed, has excellent workability in attaching terminal metal fitting 2.

Fixing shaft 22 of terminal metal fitting 2 in this example has an outer circumferential surface subjected to threading (hereinafter also referred to as a thread surface). Fixing shaft 22 in this example has a thread surface over its entire length. Thus, nuts (herein, such as base nut 23, tip nut 26) can be fastened at any positions in the longitudinal direction of fixing shaft 22. Herein, threading may be performed on the portion of fixing shaft 22 to which the nut is attached. In this form, however, the nut may be fastened improperly due to a manufacturing error or an error in assembling. When a thread surface is provided over the entire length of fixing shaft 22 as in this example, even if there is such an error, the nut can be fastened to terminal metal fitting 2 properly, so that terminal metal fitting 2 can be properly fixed to support 3 (base plate 30). Also, in this case, terminal metal fitting 2 has a simple shape and can be easily manufactured. The sectional area, outside diameter, and the like of fixing shaft 22 can be appropriately selected as long as fixing shaft 22 has a predetermined sectional area of the conductor. The length of fixing shaft 22 can be appropriately selected as long as fixing shaft 22 can be fixed to base plate 30, in accordance with the thickness or the like of base plate 30. In this example, the length of fixing shaft 22 is adjusted such that both of the base region and the tip region of fixing shaft 22 project from the front and rear surfaces of base plate 30 with fixing shaft 22 inserted into base plate 30 (FIG. 1A). Also in this example, the length of fixing shaft 22 is adjusted such that fixing shaft 22 can be inserted into collector plate 5 in addition to base plate 30 (FIG. 1A).

<<Support>>

Support 3 is a member holding each armor wire 12 in the stretched state around core 110 (FIG. 1A). Support 3 includes base plate 30 in which each terminal metal fitting 2 attached to a corresponding one of armor wires 12 is disposed, and a fixing member anchoring armor wire 12 to base plate 30. Support 3 in this example further includes a pedestal 33 fixing base plate 30 to, for example, an installation target on land. Pedestal 33 is integrally formed with base plate 30. Support 3 in this example has an inverted T-shaped cross-section cut along the plane parallel to axis L of armored cable 100, and base plate 30 is provided upright from pedestal 33 having a thick plate shape (FIG. 1A). In this example, a plurality of bolts 36 are fastened to pedestal 33 (FIGS. 1A, 2), so that support 3 is fixed to the installation target.

<Base Plate>

Base plate 30 is formed of a plate member having a uniform thickness (FIG. 1A). Core hole 31, which passes through base plate 30 from its front surface to its rear surface and into which core 110 is inserted, is provided in the central portion of base plate 30 (FIGS. 2, 4). Core hole 31 in this example is a single hole. Base plate 30 is disposed such that its front and rear surfaces are substantially orthogonal to axis L of core 110 with pedestal 33 fixed to the installation target described above (FIG. 1A), and core 110 is inserted into core hole 31. The shape and size of core hole 31 can be appropriately selected in a range that allows insertion of core 110. Core hole 31 in this example is a circular hole having an inside diameter $R_3$ much larger than an outside diameter $R_{110}$ of core 110 (see also FIGS. 2, 4).

Metal fitting holes 32, which pass through base plate 30 from its front surface to its rear surface and into each of which a corresponding one of terminal metal fittings 2 is inserted, are provided around core hole 31 in base plate 30. In this example, a plurality of metal fitting holes 32 are disposed so as to describe a concentric circle with respect to core hole 31 formed as a circular hole (see terminal metal fittings 2 of FIG. 4). Terminal metal fittings 2 fixed to base plate 30 as described above are disposed concentrically with core 110 at a predetermined spacing from core 110 (a distance from the inner circumferential edge of core hole 31 to the inner circumferential edge of each metal fitting hole 32) concentrically with core 110 (FIGS. 2, 4). The above spacing can be appropriately selected. In this example, the spacing is adjusted to make the distance between adjacent metal fitting holes 32, 32 as small as possible in a range that arrows an operation of attaching the fixing member (herein, base nut 23 and tip nut 26), which will be described below. This can easily reduce the size of support 3, leading to smaller sizes of terminal structure 1 and anchoring device 10. Also, the distances between adjacent metal fitting holes 32 are made substantially equal to each other. Consequently, for example, the tensions acting on armor wires 12 can be easily made uniform. This prevents application of an excessive amount of bending to only some of armor wires 12, so that each armor wire 12 can be easily held properly.

Core hole 31 and metal fitting holes 32 in this example are provided such that their axial directions are substantially orthogonal to the front and rear surfaces of base plate 30 (FIG. 1A). Thus, with pedestal 33 fixed to the installation target described above, the axis of core hole 31 and the axes of metal fitting holes 32 are disposed to be substantially parallel to axis L of core 110. Each terminal metal fitting 2 inserted into a corresponding one of metal fitting holes 32 is also disposed to be parallel to axis L of core 110. The portion of each armor wire 12 in the vicinity of terminal metal fitting 2 is held in the stretched state so as to be parallel to axis L of core 110.

In this example, further, the inner circumferential surface of each metal fitting hole 32 is formed of a smooth surface with which terminal metal fitting 2 is not screwed, as shown in FIG. 1B in an enlarged manner. Since terminal metal fitting 2 cannot be substantially fixed to base plate 30 by merely inserting terminal metal fitting 2 into such a metal fitting hole 32, a fixing member is used. Armor wire 12 which continues from each terminal metal fitting 2 can be prevented from being twisted with the use of the configuration in which each terminal metal fitting 2 per se is not directly screwed with base plate 30 and is inserted into base plate 30. In this example, the state of projection of each terminal metal fitting 2 is adjusted, and the positions of screwing of base nut 23 and tip nut 26, which form the fixing member together, are adjusted, thereby fastening both of base nut 23 and tip nut 26 to base plate 30. As a result, each terminal metal fitting 2 is fixed to base plate 30. In one example, the inside diameter of each metal fitting hole 32 is made as small as possible in a range that allows insertion of fixing shaft 22 of terminal metal fitting 2. In this case, the amount of movement of terminal metal fitting 2 within metal fitting hole 32 can be made small, so that terminal metal fitting 2 is resistant to positional displacement. As a result, armor wire 12 can be easily held properly.

In another example, support 3 is provided as a set of items, namely, half-section divided bodies 3A and 3B, which can be formed by dividing support 3 radially of core 110, as shown in FIG. 4. In this case, compared with the case in which support 3 is provided as an integrally formed member, support 3 is easily disposed such that core 110 is inserted into core hole 31, leading to excellent workability in construction. FIG. 4 illustrates divided bodies 3A and 3B that can be disposed so as to sandwich core 110 laterally from both sides of core 110. The direction of division of support 3 can be changed appropriately, and support 3 can also be divided vertically rather than laterally as described above. Alternatively, support 3 may be divided into three or more pieces.

Divided bodies 3A and 3B in this example are line-symmetric half-section members and are integrated with each other by coupling bolts 37, 38. Divided body 3A, 3B has a base plate piece 30A, 30B and a pedestal piece 33A, 33B. Divided body 3A, 3B has a semicircular recess in the central portion of base plate piece 30A, 30B. Divided body 3A, 3B includes, in an upper portion of substrate piece 30A, 30B, a protrusion provided with a bolt hole into which coupling bolt 37 is inserted. Pedestal piece 33A, 33B is provided with a bolt hole into which coupling bolt 38 is inserted. Through integration of divided bodies 3A and 3B, base plate pieces 30A, 30B form base plate 30, and pedestal pieces 33A and 33B form pedestal 33. Also, two semicircular recesses form one circular hole (core hole 31). The respective bolt holes of both the protrusions form a bolt hole through which the bolt holes are communicated with each other, and the respective bolt holes of pedestal pieces 33A and 33B form a bolt hole through which the bolt holes are communicated with each other.

<Fixing Member>

The fixing member may be of various forms that allow each terminal metal fitting 2 inserted into base plate 30 to be fixed to base plate 30. For example, the fixing member may be a nut that is screwed with the thread surface of fixing shaft 22 of terminal metal fitting 2. The fixing member in this example includes base nut 23 and tip nut 26 each screwed with a corresponding one of portions of the outer circumferential surface of terminal metal fitting 2, where one of the portions projects from the front surface of base plate 30 and the other portion projects from the rear surface of base plate 30 (FIG. 1A). Base nut 23 is fastened to the base region in fixing shaft 22. Tip nut 26 is fastened to the tip region in fixing shaft 22. That is to say, nuts 23, 26 are fastened to fixing shaft 22 in such a manner that base plate 30 is sandwiched between nuts 23, 26. This causes each terminal metal fitting 2 to be firmly fixed to base plate 30 though it is not directly screwed with metal fitting hole 32 of base plate 30. Consequently, a defect can be prevented even when, for example, armored cable 100 is pulled, for example, terminal metal fitting 2 can be prevented from being pulled out of metal fitting hole 32 or moving excessively in metal fitting hole 32. Only base nut 23 can be provided, or only tip nut 26 can be provided. However, nuts 23, 26 provided as in this example allow terminal metal fitting 2 to be firmly fixed to base plate 30. Further, nuts 23, 26, which are double nuts as shown in FIG. 1A, can fix terminal metal 2 to base plate 30 more firmly.

<Constituent Material>

A tension or the like is exerted on support 3 through terminal metal fittings 2 fixed to base plate 30 when, for example, armored cable 100 is pulled. Thus, the constituent material of support 3 is preferably a material capable of sufficiently withstanding the tension or the like. For example, materials having excellent strength, such as iron and iron alloy, are preferred.

<<Spacer>>

Terminal structure 1 of an armored cable in this example further includes spacer 4. Spacer 4 in this example holds part of the region (intermediate region) of each armor wire 12 apart from core 110, where the region extends from the base side (herein, the portion at which bundling band 122 is attached) close to core 110 to terminal metal fitting 2 (FIG. 1A). Spacer 4 includes a deflection part 40 that adjusts the angle of each armor wire 12 such that the portion of each terminal metal fitting 2 which is fixed to base plate 30 is parallel to axis L of core 110. Since deflection part 40 is provided, application of tension in a direction different from the direction of axis L to each armor wire 12 can be reduced more than in the case in which no deflection part 40 is provided or the case in which no spacer 4 is provided. In particular, the application of a tension in the direction different from the direction of axis L can be reduced in the vicinity of the portion of each armor wire 12 which is connected with compression part 20 of terminal metal fitting 2. In addition, each terminal metal fitting 2 is disposed to be orthogonal to the front and rear surfaces of base plate 30, and accordingly, base nut 23 and tip nut 26 can be fastened easily, leading to excellent workability.

It is conceivable that each armor wire 12 will be anchored to base plate 30 so as to cross axis L over the entire region from the base side to the tip side of armor wire 12. In this case, it is conceivable that metal fitting hole 32 will be provided as an inclined hole crossing axis L and will be disposed such that the axis of this inclined hole crosses the front and rear surfaces of base plate 30. This configuration, however, fastens nuts 23, 26 less sufficiently and provides a lower strength than the configuration in the example described above. The example described above is thus preferred.

Spacer 4 in this example is an annular plate member. A through hole (core hole 41) into which core 110 is inserted is provided in the central portion of spacer 4. Also, spacer 4 in this example includes a pair of semi-annular plate pieces, and both the plate pieces are integrated into a set of items using bolts (not shown) and nuts (shown). Such a spacer 4 can be easily disposed so as to sandwich core 110 laterally from both sides of core 110, leading to excellent workability in construction. The constituent material of spacer 4 is, for example, stainless steel.

An inside diameter $R_4$ of core hole 41 can be appropriately selected within a range that allows insertion of core 110. Although inside diameter $R_4$ in this example is larger than an inside diameter $R_3$ of core hole 31 of support 3 (FIG. 1A), it can be equal to or smaller than inside diameter $R_3$.

In spacer 4 in this example, corners between the surface (the right surface in FIG. 1A) disposed on the base side of armor wire 12 and the outer circumferential surfaces (the upper and lower surfaces in FIG. 1A) supporting armor wire 12 are rounded at a predetermined radius of curvature. The curved surface obtained by rounding is deflection part 40. As shown in FIG. 1A, part of the intermediate region of armor wire 12 is caused to follow deflection part 40 formed of the curved surface, so that the angle of the region of armor wire 12 which is closer to terminal metal fitting 2 can be changed. Deflection part 40 allows the region of each armor wire 12 which is closer to terminal metal fitting 2 to be disposed parallel to axis L. It suffices that the radius of curvature is adjusted appropriately such that each armor wire 12 can be disposed while being deflected. The base region of each armor wire 12 is disposed obliquely to cross axis L of core 110.

Further, coupling members 42 fixing spacer 4 to support 3 can be included. As spacer 4 is fixed to support 3 (herein base plate 30) with coupling members 42 therebetween, the position of core 110 in the direction of axis L is not substantially displaced in spacer 4. Each armor wire 12 can thus keep an angle adjusted by deflection part 40 properly for a long period.

Coupling member 42 in this example is a rod member subjected to threading over the entire length on its outer circumferential surface. One end of coupling member 42 is a portion fixed to spacer 4, and the other end is a portion fixed to base plate 30. A screw hole (not shown) into which one end of coupling member 42 is screwed is formed in spacer 4. Directly screwing one end of coupling member 42 into spacer 4 can easily couple spacer 4 to coupling member 42. Base plate 30 is provided with through holes 42*h* (see FIG. 1B), into each of which the other end of coupling member 42 is inserted. FIG. 4 illustrates a state in which in base plate 30, coupling members 42 are disposed equidistantly from the inner circumferential edge of core hole 31 in the region between the inner circumferential edge of core hole 31 and a virtual circle formed by terminal metal fittings 2. The other end of coupling member 42 is disposed to project from the front and rear surfaces of base plate 30, and each nut 46 is fastened to a corresponding one of the projecting portions (FIG. 1A). Fastening nuts 46, 46 so as to sandwich the front and rear surfaces of base plate 30 can firmly fix coupling member 42 to base plate 30. Consequently, spacer 4 can be fixed to base plate 30 more firmly with coupling members 42 therebetween. With the configuration in which coupling members 42 are not directly screwed with base plate 30 and nuts 46 are fastened as in this example, coupling members 42 can be easily attached to base plate 30, leading to excellent workability.

Furthermore, an intervening portion 48 can be provided between the outer circumferential surface of core 110 and the inner circumferential surface of core hole 41. Intervening portion 48 can be used as a temporal holding member for holding annular spacer 4 at a predetermined position on the outer circumference of core 110 until spacer 4 is fixed to base plate 30. Intervening portion 48 in this example is a semicircular-arc-shaped plate member and has an inner circumferential surface extending along the outer circumferential surface of core 110 and an outer circumferential surface extending along the inner circumferential surface of core hole 41. Intervening portion 48 may be an annular plate member. However, spacer 4 can be held by providing intervening portion 48 having a semicircular-arc shape as described above and disposing intervening portion 48 in approximately the upper half of core 110. Thus, no intervening portion 48 may be provided in the lower portion of core 110. Also, intervening portion 48 can be omitted.

<<<Collector Plate>>>

Terminal structure 1 of an armored cable in this example further includes collector plate 5 connected with the tip of each terminal metal fitting 2 (FIG. 1A). Collector plate 5 is a member which is electrically connected with each armor wire 12 through the tip of a corresponding one of terminal metal fittings 2 and collects the respective currents flowing through armor wires 12. Collector plate 5 in this example is connected with grounding conductor 6 for use in grounding. As a result of the connection of terminal metal fittings 2, collector plate 5 is fixed to base plate 30 of support 3.

Collector plate 5 in this example is an annular plate member. A through hole (core hole 51) into which core 110 is inserted is provided in the central portion of collector plate 5 (FIG. 2). Core hole 51 is disposed concentrically with core 110 and core hole 31 of base plate 30 of support 3 (FIG. 1A). Also, collector plate 5 includes through holes (metal fitting holes 52, FIG. 1A) into each of which the tip of a corresponding one of terminal metal fittings 2 is inserted so as to surround core hole 51 (FIG. 2). Metal fitting hole 52 of collector plate 5 is provided to overlap metal fitting hole 32 of base plate 30 with collector plate 5 fixed to base plate 30 (FIG. 1A). Terminal metal fitting 2 inserted into metal fitting hole 52 of collector plate 5 is disposed such that part of each fixing shaft 22 projects from the front and rear surfaces of collector plate 5. Part of fixing shaft 22 is disposed to span from base plate 30 to collector plate 5. The tip of fixing shaft 22 projects from the surface (the left surface in FIG. 1A) of collector plate 5 disposed on the tip side of core 110. In this example, nuts 56, 56 are fastened to the respective portions projecting from the front and rear surfaces of collector plate 5 (FIG. 1A). That is to say, nuts 56, 56 are fastened to fixing shaft 22 such that collector plate 5 is sandwiched between nuts 56, 56. The configuration in which each terminal metal fitting 2 is not directly screwed with metal fitting hole 52 of collector plate 5 but is inserted into collector plate 5 to be fastened with nut 56 can firmly connect each terminal metal fitting 2 to collector plate 5. Nut 56 on any one of the front and rear surfaces of collector plate 5 may be omitted. However, providing nuts 56, 56 on the opposite surfaces of collector plate 5 as in this example can firmly connect each terminal metal fitting 2 to collector plate 5. Nuts 56, 56, which are double nuts as shown in FIG. 1A, can fix terminal metal 2 to collector plate 5 more firmly.

Furthermore, collector plate 5 in this example is a set of items including divided pieces 5*a* and 5*b* formed of a pair of semi-annular plates each provided with a semicircular recess as shown in FIG. 2. Divided pieces 5*a* and 5*b* are integrated with each other using coupling bolts 58 and nuts. FIG. 2 illustrates what is divided so as to sandwich core 110 from above and below core 110 by way of example. Divided pieces 5*a* and 5*b* in this example include, at the opposite circumferential ends, flanges 59, 59 projecting radially outwardly. Flanges 59, 59 of divided pieces 5*a* and 5*b* are laid on one another, and coupling bolts 58 and nuts are fastened to flanges 59, 59, thereby integrating divided pieces 5*a* and 5*b* with each other. Collector plate 5 in this example further includes coupling plates 57. Coupling plates 57 are disposed to span across the joints formed by divided pieces 5*a* and 5*b*. Herein, two joints are provided, and accordingly, two coupling plates 57 are provided. Also, herein, coupling plates 57 are disposed on one surface of collector plate 5. This one surface is a surface (the surface facing the viewer in FIG. 2) disposed on the tip side of core 110 in collector plate 5. Each coupling plate 57 includes through holes (not shown) into which terminal metal fittings 2 are inserted, and nuts 56 are fastened thereto. Coupling plates 57 are integrated with divided pieces 5*a* and 5*b* by individually fastening nuts 56, 56 to terminal metal fittings 2, 2 located to sandwich the joint therebetween.

The constituent material of collector plate 5 is preferably made of copper or copper alloy. This is because copper or copper alloy, which has high conductivity, can be used satisfactorily as a conductive portion together with armor wire 12. It suffices that the size of collector plate 5 (e.g., the inside diameter, outside diameter, and thickness of core hole 51) is appropriately selected to have a predetermined sectional area of the conductor. Illustrated herein is a case in which the inside diameter of core hole 51 is larger than inside diameter $R_4$ of spacer 4 (FIG. 1A).

(Armor Wire Anchoring Device)

Armor wire anchoring device 10 according to the embodiment includes terminal metal fittings 2 and support 3 described above. Armor wire anchoring device 10 may further include spacer 4, coupling member 42, or intervening portion 48 described above, or include collector plate 5. The details of the respective components are as described above.

(Procedure of Construction)

Terminal structure 1 of an armored cable according to the embodiment is constructed as follows, for example. The steps of construction will be schematically described below.

(1) The end of armored cable 100 is stage-stripped to expose core 110 and armoring 120.

(2) At the exposed portion of armoring 120, bundling band 122 is attached to the base side close to the anticorrosive layer. Terminal metal fitting 2 is attached to the tip of each armor wire 12.

(3) Support 3 is disposed at an appropriate position of the exposed portion of core 110, and also, spacer 4 is disposed.

In this example, divided bodies 3A and 3B constituting support 3 and half-section members constituting spacer 4 are each disposed on the outer circumference of core 110, and then, the half-section members are integrated with each other. Until spacer 4 is fixed to support 3 by coupling members 42, intervening portion 48 is disposed between the outer circumferential surface (the upper half in FIG. 1A) of core 110 and core hole 41 of spacer 4 to hold spacer 4 on the outer circumference of core 110. Divided bodies 3A and 3B constituting support 3 are integrated with each other, and then, spacer 4 is fixed to support 3 by coupling members 42.

(4) Each terminal metal fitting 2 is inserted into base plate 30 of support 3 and is fixed by base nut 23 and tip nut 26.

In this example, part of the intermediate region of each armor wire 12 is caused to follow deflection part 40 of spacer 4. Each terminal metal fitting 2 attached to the tip side of a corresponding one of armor wires 12 is inserted into metal fitting hole 32 of base plate 30. Subsequently, the positions of screwing of nuts 23, 26 are adjusted while the state of projection of fixing shaft 22 is adjusted, and then, both of nuts 23, 26 are fastened. Base nut 23 is attached to fixing shaft 22 in advance.

(5) Collector plate 5 is connected to the tip of each terminal metal fitting 2.

In this example, divided pieces 5a and 5b are disposed on the tip side of core 110 relative to base plate 30 of support 3 and are integrated with each other using coupling bolts 58 and nuts. Each terminal metal fitting 2 is inserted into metal fitting hole 52, and appropriately into the through holes of coupling plate 57 and grounding conductor 6. The positions of screwing of nuts 56, 56 are adjusted while the state of projection of fixing shaft 22 in each terminal metal fitting 2 is adjusted, and then, nuts 56, 56 are fastened.

(6) When armoring 120 is formed of multiple wire rod layers, the steps (2) to (5) described above are repeatedly performed in order from the inner wire rod layer, thereby anchoring armor wire 12. In this case, a plurality of supports 3 are prepared corresponding to the wire rod layers. Supports 3 are disposed to be apart from each other in the direction of axis L of core 110. Armor wire 12 (terminal metal fitting 2) forming each wire rod layer is fixed to a corresponding one of supports 3 which is disposed at an appropriate position. Support 3 supporting the outer wire rod layer is disposed on the base side of core 110. Support 3 supporting the inner wire rod layer is disposed on the tip side of core 110. Supports 3 are disposed at multiple stages from the base side toward the tip side of core 110, and then, each wire rod layer is anchored.

(7) Further, the end of armored cable 100, the exposed portion of each armor wire 12, base plate 30 of support 3, collector plate 5, the vicinity of the connection of grounding conductor 6 with collector plate 5 can be housed in a housing case (not shown). Also, a filler, for example, a compound, can fill the housing case as appropriate. Consequently, wire 12 or the like can be more reliably protected mechanically or protected from the environment.

(Main Effects)

Terminal structure 1 of an armored cable according to the embodiment and armor wire anchoring device 10 according to the embodiment allow terminal metal fitting 2 attached to each armor wire 12 to be inserted into base plate 30 of support 3 and to be fixed to base plate 30 with a fixing member (herein, base nut 23 and tip nut 26). Such a configuration can maintain each armor wire 12 in the stretched state. This can reduce application of an excessive amount of bending to each armor wire 12 even when, for example, armored cable 100 is caught and pulled by an anchor of a ship. Thus, terminal structure 1 of an armored cable according to the embodiment and armor wire anchoring device 10 according to the embodiment can anchor each armor wire 12 for a long period when each armor wire 12 is made of copper or copper alloy, so that the copper-based armoring can be suitably used as a conductive portion.

Terminal structure 1 of an armored cable and armor wire anchoring device 10 in this example further achieve the following effects.

(a) Base nut 23 and tip nut 26 are fastened to each terminal metal fitting 2 inserted into metal fitting hole 32 of base plate 30, thus easily fixing each terminal metal fitting 2 to base plate 30. This leads to excellent workability.

(b) Since spacer 4 provided with deflection part 40 is included, each armor wire 12 can be held appropriately. This leads to a further reduction in application of an excessive amount of bending to each armor wire 12. Also, spacer 4 can be fixed to base plate 30 by coupling members 42 to prevent a positional displacement of spacer 4 more reliably, so that each armor wire 12 can be held properly.

(c) Since each terminal metal fitting 2 is not directly screwed with base plate 30, armor wire 12 continuous from each terminal metal fitting 2 can be firmly fixed to base plate 30 without being twisted. Also, each terminal metal fitting 2 is not directly screwed with collector plate 5, preventing twist of armor wire 12.

(d) Since collector plate 5 is included, the respective currents flowing through armor wires 12 can be collected efficiently.

The scope of the present invention is defined not by the above-described embodiments but by the claims. It is intended that the scope of the present invention includes any modification within the scope and meaning equivalent to the scope of the claims.

For example, at least one of the following changes can be made.

(1) Terminal structure 1 of an armored cable and armor wire anchoring device 10 are used at an intermediate connection, such as a connection (repair connection) between a submarine cable and an auxiliary cable.

In this case, for both of an end of the submarine cable and an end of the auxiliary cable, armor wire 12 is anchored using terminal metal fittings 2 and support 3 described above. It is conceivable that support 3 will include no pedestal 33 and that base plate 30 on the submarine cable side and base plate 30 on the auxiliary cable side will be coupled to each other by a coupling shaft. Also, it is conceivable that in place of grounding conductor 6, collector plate 5 on the submarine cable side and collector plate 5 on the auxiliary cable side will be coupled to each other by a coupling conductor.

(2) Terminal metal fitting 2 includes a flange projecting radially outwardly of fixing shaft 22, in place of base nut 23. Another bolt is fastened to this flange to fix terminal metal fitting 2 to base plate 30.

(3) Support 3 is provided as an integrally formed article not as a set of items, divided bodies 3A and 3B.

(4) Collector plate 5 is provided as an integrally formed article not as a set of items, divided pieces of 5a and 5b.

REFERENCE SIGNS LIST 1 terminal structure of armored cable
10 armor wire anchoring device
12 armor wire
2 terminal metal fitting
   20 compression part, 21 closed hole, 22 fixing shaft,
   23 base nut (fixing member), 25 filler, 26 tip nut (fixing member)
3 support
   3A, 3B divided body, 30 base plate,
   30A, 30B base plate piece, 31 core hole (first through hole),
   32 metal fitting hole (second through hole), 33 pedestal,
   33A, 33B pedestal piece, 36 bolt, 37, 38 coupling bolt,
4 spacer
   40 deflection part, 41 core hole, 42 coupling member,
   42h through hole, 46 nut, 48 intervening portion
5 collector plate
   5a, 5b divided piece, 51 core hole, 52 metal fitting hole,
   56 nut,
   57 coupling plate, 58 coupling bolt, 59 flange
6 grounding conductor
100 armored cable
   110 core, 120 armoring, 122 bundling band

The invention claimed is:

1. A terminal structure of an armored cable, the terminal structure comprising:
an end of an armored cable including
a core including an insulating layer on an outer circumference of a conductor, and
an armoring including a plurality of armor wires disposed on an outer circumference of the core, the plurality of armor wires being made of copper or copper alloy;
a plurality of terminal metal fittings each with a first end attached to an end of a respective one of the plurality of armor wires and a second end that extends away from the end of the respective one of the plurality of armor wires, wherein the second end does not overlap the respective one of the plurality of armor wires; and
a support disposed on a tip side of the core and supporting the plurality of terminal metal fittings,
wherein the support includes
a base plate provided with
a first through hole into which the core is inserted, and
a plurality of second through holes which are provided on an outer circumference of the first through hole and into each of which a corresponding one of the plurality of terminal metal fittings is inserted, and
a fixing member fixing each of the plurality of terminal metal fittings to the base plate, and
wherein the first end of each of the plurality of terminal metal fittings is provided between the end of the respective one of the plurality armor wires and the plurality of second through holes.

2. The terminal structure of an armored cable according to claim 1, wherein
the plurality of terminal metal fittings fixed to the base plate are disposed concentrically with the core at a predetermined spacing from the core,
the terminal structure comprises a spacer holding part of a region of each of the plurality of armor wires apart from the core, the region extending from a base side close to the core to the terminal metal fitting, and
the spacer includes a deflection part that adjusts an angle of each of the plurality of armor wires such that a portion of each of the plurality of terminal metal fittings which is fixed to the base plate is parallel to an axial direction of the core.

3. The terminal structure of an armored cable according to claim 2, comprising a coupling member fixing the spacer to the support.

4. The terminal structure of an armored cable according to claim 1, wherein
the terminal metal fitting has an outer circumferential surface subjected to threading,
the fixing member includes a base nut and a tip nut each screwed with a corresponding one of portions of the outer circumferential surface of the terminal metal fitting, one of the portions projecting from a front surface of the base plate, the other portion projecting from a rear surface of the base plate, and
an inner circumferential surface of each of the plurality of second through holes is formed of a smooth surface with which the terminal metal fitting is not screwed.

5. The terminal structure of an armored cable according to claim 1, comprising a collector plate disposed on the tip side of the core relative to the base plate and connected with a tip of each of the plurality of terminal metal fittings.

6. An armor wire anchoring device for anchoring armor wires at an end of an armored cable including a core and an armor, the core including an insulating layer on an outer circumference of a conductor, the armoring including a plurality of armor wires disposed on an outer circumference of the core, the armor wire anchoring device comprising:
a plurality of terminal metal fittings each with a first end attached to an end of a respective one of the plurality of armor wires and a second end that extends away from the end of the respective one of the plurality of armor, wherein the second end does not overlap the respective one of the plurality of armor wires and the plurality of armor wires are made of copper or copper alloy; and
a support supporting the plurality of terminal metal fittings, wherein
the support includes
a base plate provided with
a first through hole into which the core is inserted, and
a plurality of second through holes which are provided on an outer circumference of the first through hole and into each of which a corresponding one of the plurality of terminal metal fittings is inserted, and
a fixing member fixing each of the plurality of terminal metal fittings to the base plate, and
wherein the first end of each of the plurality of terminal metal fittings is provided between the end of the respective one of the plurality armor wires and the plurality of second through holes.

* * * * *